US012331906B2

(12) United States Patent
Pickard et al.

(10) Patent No.: US 12,331,906 B2
(45) Date of Patent: Jun. 17, 2025

(54) HEALTH-SUPPORTIVE TASK LAMP

(71) Applicant: KORRUS, INC., Los Angeles, CA (US)

(72) Inventors: Paul Kenneth Pickard, Los Angeles, CA (US); Robert Fletcher, Los Angeles, CA (US)

(73) Assignee: KORRUS, INC., Los Angeles, CA (US)

( * ) Notice: Subject to any disclaimer, the term of this patent is extended or adjusted under 35 U.S.C. 154(b) by 0 days.

(21) Appl. No.: 18/648,273

(22) Filed: Apr. 26, 2024

(65) Prior Publication Data

US 2025/0027625 A1 Jan. 23, 2025

Related U.S. Application Data

(60) Provisional application No. 63/462,105, filed on Apr. 26, 2023.

(51) Int. Cl.

| | |
|---|---|
| ***F21S 6/00*** | (2006.01) |
| ***F21Y 113/13*** | (2016.01) |
| ***H05B 47/105*** | (2020.01) |
| ***H05B 47/16*** | (2020.01) |

(52) U.S. Cl.
CPC ............ *F21S 6/003* (2013.01); *H05B 47/105* (2020.01); *H05B 47/16* (2020.01); *F21Y 2113/13* (2016.08)

(58) Field of Classification Search
CPC .......... F21S 6/003; F21S 6/008; H05B 47/16; H05B 47/105; A61N 5/0613; A61N 5/0618
USPC ...................................................... 362/1, 410
See application file for complete search history.

(56) References Cited

U.S. PATENT DOCUMENTS

| | | | | |
|---|---|---|---|---|
| 2018/0077767 | A1* | 3/2018 | Soler | H05B 45/20 |
| 2018/0318602 | A1* | 11/2018 | Ciccarelli | A61M 21/02 |
| 2022/0110194 | A1* | 4/2022 | Vissenberg | F21S 6/008 |
| 2024/0416140 | A1* | 12/2024 | Harrison | A61N 5/0613 |

* cited by examiner

*Primary Examiner* — Thomas M Sember
(74) *Attorney, Agent, or Firm* — FisherBroyles LLP

(57) ABSTRACT

A lamp comprising: (a) a work light source configured to emit work light downward to illuminate a work surface; (b) a circadian stimulation (CS) light source having a light emitting surface for emitting CS light in at least a first mode normal to said work light, CS light in said first mode having a first EML and a first brightness sufficient to cause circadian entrainment in a user.

20 Claims, 4 Drawing Sheets

Observer view

HEALTH-SUPPORTIVE TASK LAMP

REFERENCE TO RELATED APPLICATION

This application is based on U.S. Provisional Application No. 63/462,105, entitled HEALTH-SUPPORTIVE TASK LAMP, filed Apr. 26, 2023, which is incorporated by reference in its entirety.

FIELD OF INVENTION

The present application relates, generally, to work lamps, and, more specifically, to work lamps for circadian entrainment of the lamp user.

BACKGROUND

During the day, people require an adequate amount of blue light to enter the eye over a sustained duration to entrain a person's circadian rhythms. For people that spend time outdoors in a sunny environment during the day, this isn't an issue. Outdoor light levels can be hundreds of times brighter than indoor lighting, providing more than adequate circadian entrainment in relatively short periods of time (approximately an hour, depending on individual's light sensitivity.)

However, for people that do not spend significant time outdoors in a sunny environment, indoor light levels using traditional light sources such as Florescent or LED lighting do not provide adequate blue content to constitute a good "day" signal to the brain for circadian entrainment. As such, health-conscious building recommendations such as the WELL Building Standard (V2) recommend 275 EML (Equivalent Melanopic Lux) on a vertical surface in occupants' fields of view for 4 hours per day to facilitate good circadian health. This requires not only the conscious choice of light sources that can deliver such blue-enriched light at normal light levels to achieve this requirement, but also purposeful lighting design and complementary architecture such that the light paints vertical surfaces in occupants' fields of view. Many office spaces today are designed as "open offices"-meaning very few walls are available to paint with light for this purpose.

Therefore, there is a need to provide high EML vertical lighting in an office setting even if there are few walls available on which to project the light. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant recognizes that task lamps provide a unique opportunity to provide office workers with the high EML vertical lighting they need.

By way of background, in professional and home office environments, task lighting has been valued for the ability to provide personalized lighting for individual users. Moreover, in a commercial environment, it has been shown that task lighting is more energy efficient. General lighting systems provide the same level of illumination everywhere, typically including walkways between desks or non-critical areas. By providing recommended Lux or foot-candle levels everywhere, the areas illuminated to these levels that are not work surfaces are overlit, and therefore the energy is wasted. General lighting might target 500 lux or 50 foot-candles at the work surface in a professional environment. By providing general illumination at 150 lux or 15 foot-candles, and then supplementing the dimmer general lighting with task lighting provides multiple benefits:

- CCT-tunable task lighting can be provided, offering lighting suited to the individual user's preferences.
- Brightness can be tuned to the individual user's preferences.
- Task lighting can be turned off when individual users are away from their desks, whereas occupancy sensing for general illumination in office environments is only similarly effective when every desk in a zone is unoccupied.

These are known benefits of task lighting. However, there is an unexploited benefit of task lighting yet to be explored—i.e., individualized lighting to support circadian entrainment.

The light system of the present invention adds to the traditional benefits of task lighting (personalization of work plane illuminance and color temperature, and energy savings associated with reduction in general illumination intensities) by including multiple modes of circadian effective lighting and incorporating functionality traditionally reserve for consumer electronics lighting as well. Thus, unlike traditional LED task lamps that often try to minimize the profile of the lamp "head" itself, to approximate a plane light emitting onto the work plane "from out of nowhere" as closely as possible, the lamp of the present invention involves a user-facing light emitting surface for emitting light toward the user to cause circadian entrainment in the user.

In one embodiment, the invention relates to a lamp comprising: (a) a work light source configured to emit work light downward to illuminate a work surface; (b) a circadian stimulation (CS) light source having a light emitting surface for emitting CS light in at least a first mode normal to said work light, CS light in said first mode having a first EML and a first brightness sufficient to cause circadian entrainment in a user.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1:
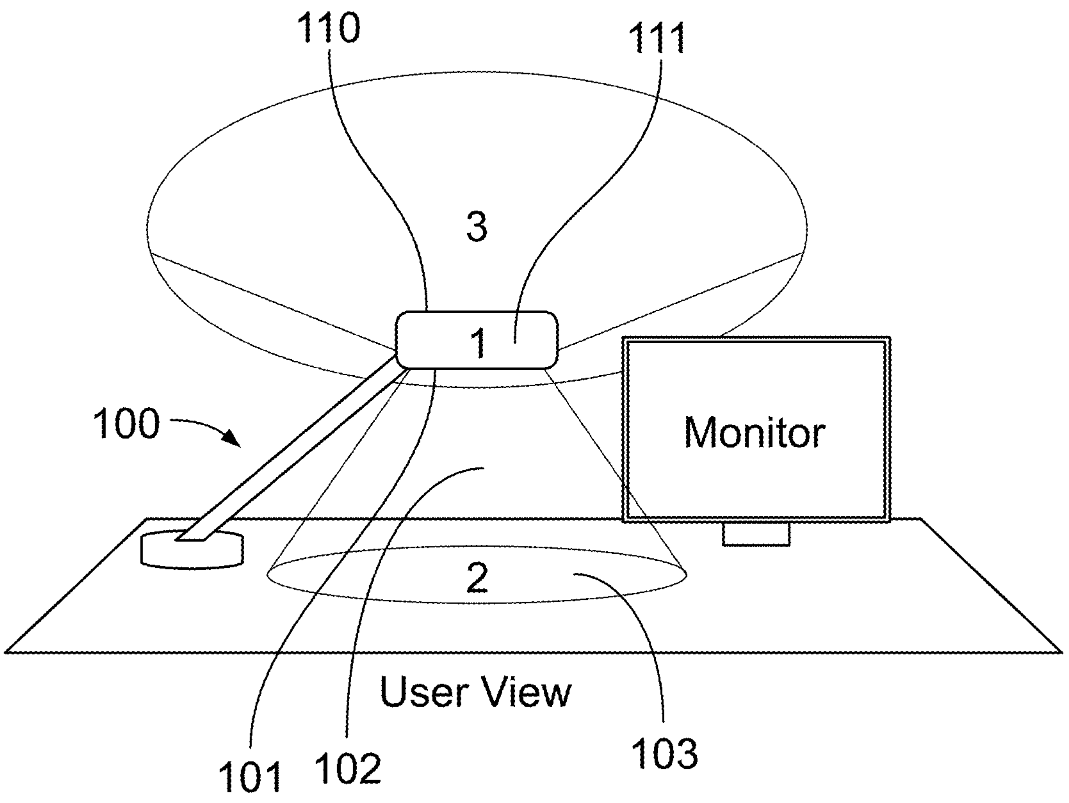
FIGS. 1-2 show schematics of one embodiment of the lighting system of the present invention from different perspectives.
Figure 2:
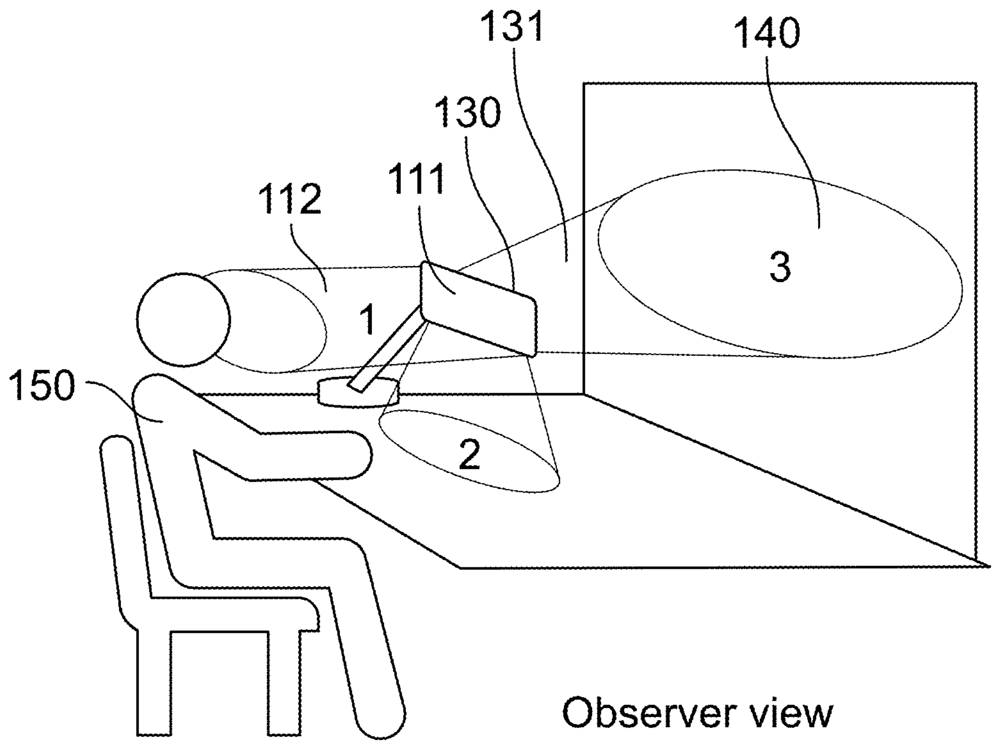

Referring to FIGS. 1 and 2, one embodiment of the lamp 100 of the present invention is shown. The lamp 100 comprises a work light source 101 configured to emit work light 102 downward to illuminate a work surface 103. The lamp also comprises a circadian stimulation (CS) light source 110 having a light emitting surface 111 for emitting CS light 112 in at least a first mode normal to said work light 102. The CS light 112 in said first mode having a first EML and a first brightness sufficient to cause circadian entrainment in a user 150. Each of these features is described below in more detail and with respect to selected embodiments.

CS light Source

An important feature of a preferred embodiment of the present invention is the user-facing planar light emitting surface 111 which is used to provide long time exposure, blue-enriched, low brightness light for everyday use to improve circadian entrainment and help meet vertical EML requirements for the WELL Building Standard. As set forth above, the WELL Building Standard is 275 EML for four (4) hours per day.

Accordingly, in one embodiment, the CS light 112 is enhanced with circadian stimulating blue light to achieve this WELL Building Standard. In one embodiment, the EML exceeds 275 such that fewer than four 4 hours are required to get the proper dose of CS light. In another embodiment, the EML is below 275 such that the proper dose of CS light is not exceeded during an ordinary workday. Still other embodiments will be obvious to those of skill in the art in light of this disclosure. Accordingly, in one embodiment, the first EML is at least 50, 100, 150, 200, 250, 300, or 350. In one embodiment, the first EML is at least 275.

In one embodiment, the brightness of the user-facing light-emitting surface is low as to not bother/annoy the user. Those of skill the art in light of this disclosure will be able to tune the light-emitting surface to a comfortable brightness. In one embodiment, the first brightness is at least 10, 30, 50, 75, 100, 150, 200, 300, 400, 500, 600, 700, 800, 900, or 1000 nits, and is no greater than 10,000, 7000, 5000, 3000, 2000, 1000, 900, 800, or 700 nits. In one embodiment, the first brightness is about 300 to 800 nits.

In one embodiment, the CS light source is configured to emit CS light in a second mode for short time exposure, blue-enriched, higher brightness light for occasional use to boost alertness, improve mood (SAD lamp) and improve circadian entrainment over a shorter period of time, and/or act as a high color quality "selfie lamp" for video-conferencing, video recording, and other applications requiring high color quality planar illumination of the user's face.

In one embodiment, the CS light in the second mode has a second EML and a second brightness, wherein at least one of the second EML or the second brightness is greater than the first EML or the first brightness, respectively. In one embodiment, the second EML is at least 2× the first EML. In one embodiment, the second brightness is at least 2× the first brightness. In one embodiment, both the second EML and second brightness are greater than the first EML and the first brightness respectively.

The CS light is used optionally to provide enhanced sliding of the user for video or other similar applications. In such an embodiment, CS light is important. Accordingly, in one embodiment, the CS light source is configured to emit high quality light in a second mode. The high-quality light in the second mode has a second CRI and a second brightness, wherein the second CRI and the second brightness or greater than the first CRI and the first brightness respectively. In one embodiment, the second CRI is greater than 90, 91, 92, 93, 94, or 95.

Because the CS light in the second mode in this embodiment is used to illuminate the user's face, it should be relatively bright especially compared to the first brightness. Accordingly, in one embodiment, the second brightness is at least 2× the first brightness.

Work Light

In one embodiment, the work light is a downward facing, optically shielded light source which is used to provide user-tunable brightness and/or correlated color temperature (CCT) light on the work surface 103 without the harsh glare associated with some traditional slim-line LED desk lamps. In one embodiment, the work light as a maximum work light brightness at least 2× the first brightness. In one embodiment, the CCT is adjustable between 2500 and 6,000K.

Projector.

In one embodiment, the lamp further comprises a projection light source 130 for emitting projected light 131 to illuminate a wall 140. This can be used to enhance the user facing light-emitting surface. Specifically, the user facing light-emitting surface is, in one embodiment, relatively small—for example, perhaps 100 mm×200 mm, so 0.02 sq meters. Small amounts of light are capable of creating a high luminance level, i.e. 10 lumens with this surface area would create 500 nits (or 500 lux, translated to units meant for a surface lit by an external source. Consequently, there is only so much energy such a surface can provide to a user's eyes and remain unobjectionable (perhaps 1000 nits or lux, but still only 20 lumens.) However, the rear-facing light source can be defined by optical distribution to create a pattern of nearly uniform brightness on the wall of nearly 1 m×1 m, for 1 square meter. This has multiple positive outcomes:

- Projecting the light onto a larger surface area allows for more available energy to enter the user's eyes, because it will be in their field of view more often than a small source.
- Projecting the light onto a larger surface area requires greater lumens to be used to create the effect (i.e. a 1000 lux would require 1000 lumens to achieve it)
- Projecting the light onto a larger surface area allows for an "area source" in the mode where the task lamp is being used as a selfie light. This is a similar sort of approach that professional photographers use when taking pictures where it is undesirable to have reflected images of bright light sources in the picture and harsh shadows are to be avoided.

As shown in FIGS. 1 and 2, in one embodiment, the projected light is emitted in a direction opposite from light being emitted from the light emitting surface.

In one embodiment, the projected light has a third EML and a third brightness wherein the third brightness is greater than the first brightness. For example, in one embodiment, the third EML is at least 50, 100, 150, 200, 250, 300, or 350.

In one embodiment, the third brightness is sufficient to illuminate the user's face reflected light from the illuminated wall 140. In such an embodiment, it may be preferable to use high quality of light. In one embodiment, the projected light has a CRI of greater than 90, 91, 92, 93, 94, or 95.

Figure 3:
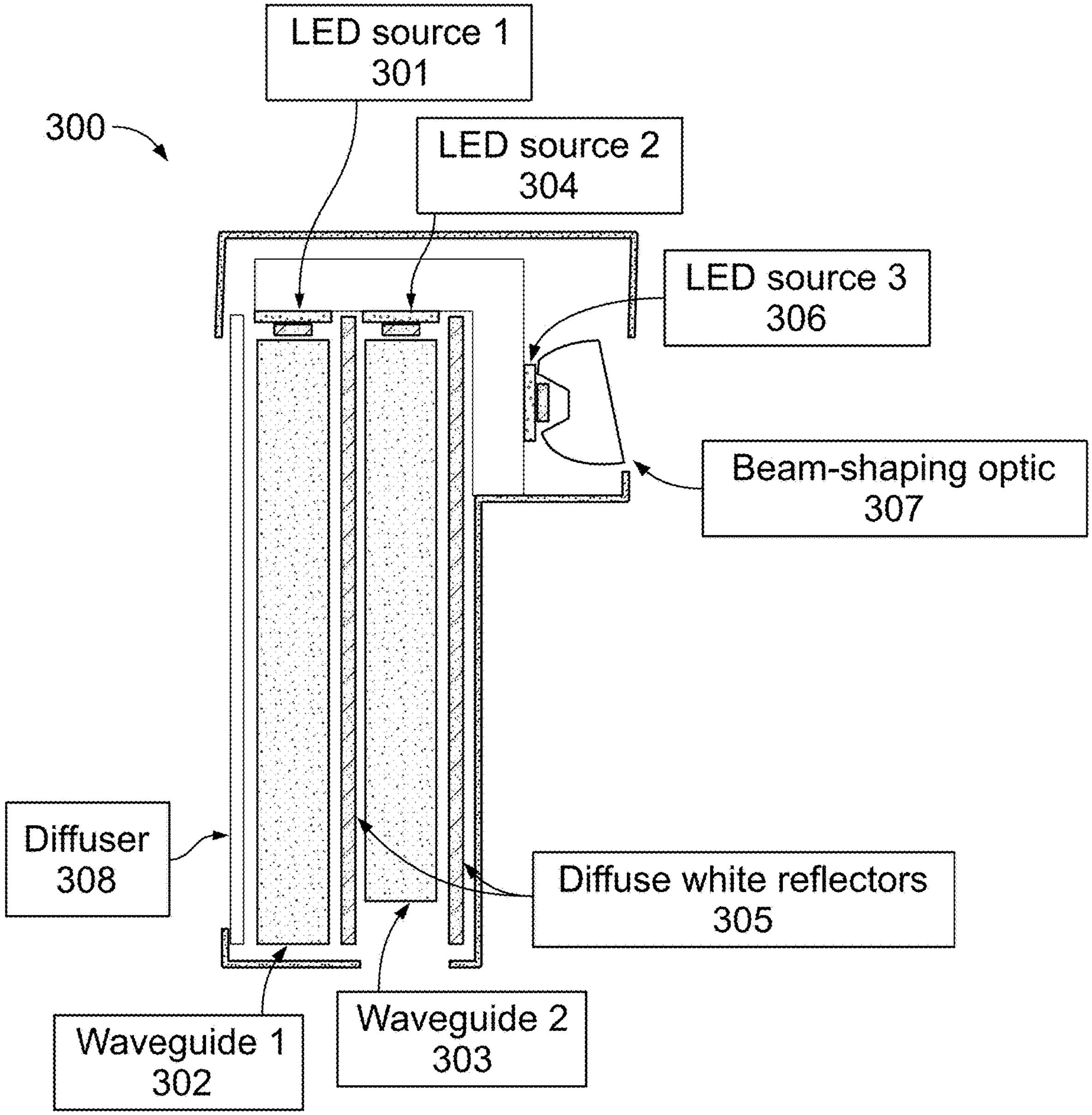
FIGS. 3 and 4 shows alternative embodiments of the lighting system of the present invention.
Figure 4:
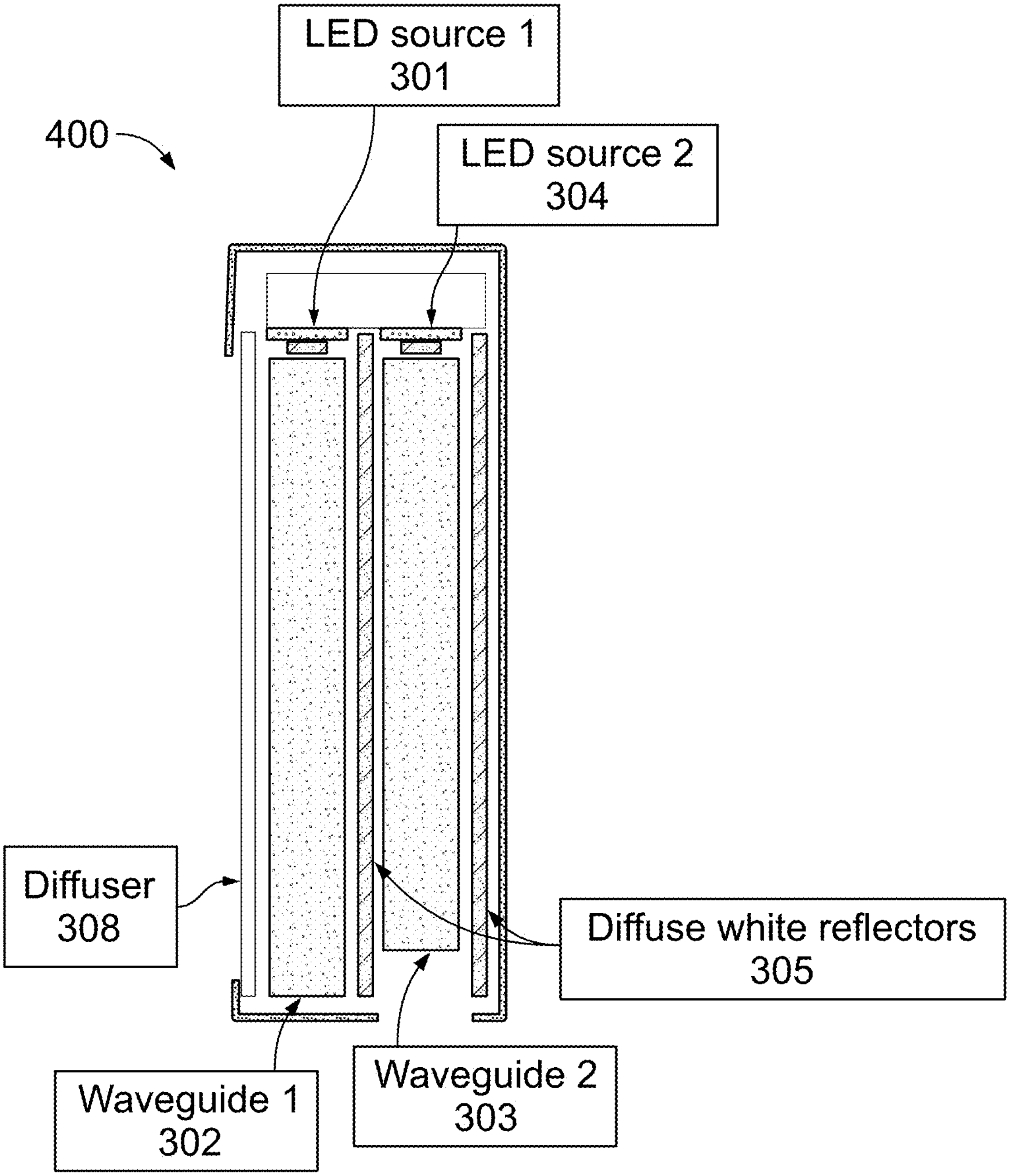
Figure 5:
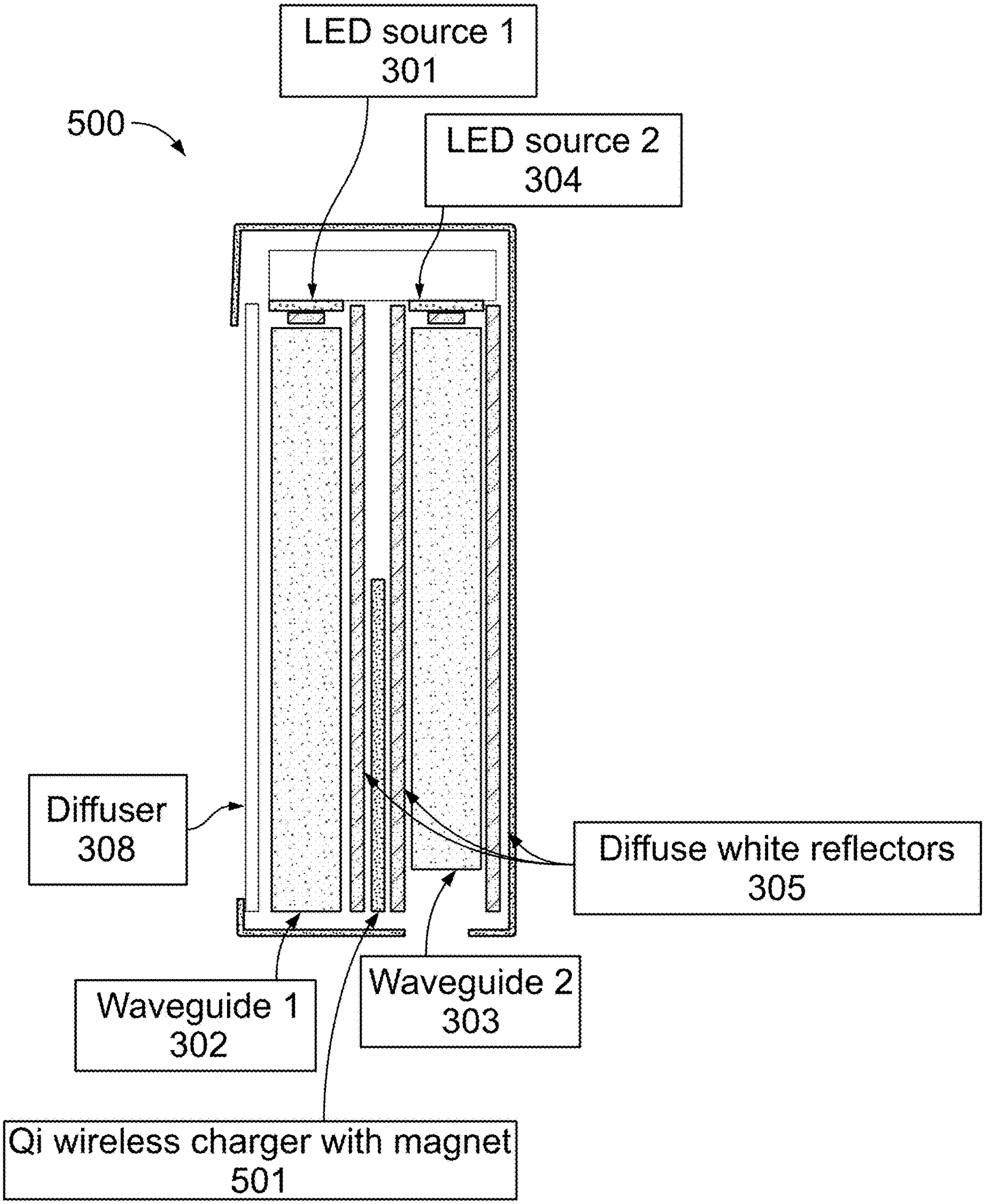
FIG. 5 shows an alternative embodiment of the lighting system of the present invention with an integrated charger for a cell phone.

Referring to FIGS. 3-5, cross-sectional schematics are shown of different embodiments of the lamp of the present invention. It should be understood that these are just examples and that other embodiments will be obvious to those of skill in light of this disclosure.

In the embodiment of the lamp 300 of FIG. 3, LED light is injected from LED source 301 into Waveguide 302. Such light could be blue enriched cool white light but could also include violet-enhanced warm white light for alertness and aesthetic impact, long-red light for eye health, or other light that would benefit circadian, eye, or general human health. Waveguide 302 would include injection-molded, hot-pressed or laser etched light extraction features on the interior wall to produce and even light output through the diffuser 308 (in place to prevent pixelation.) The highly reflective diffuser white reflector 305 to the interior of Waveguide 302 insures no cross-talk between Waveguide 302 and Waveguide 303, as well as recycling any light lost at the interior surface of Waveguide 302 back through the Diffuser to reach the users eyes, improving efficiency.

LED source 304 injects light (which could be CCT tunable high CRI light, violet-enhanced CCT tunable high CRI light, or static light of either previous description) into Waveguide 303. Waveguide 303 has diffuse, highly reflective (99%+) reflectors 305 on both the front and rear surfaces, and no light extraction features along its length. At the opposite end of Waveguide 303 from LED source 304, the light will exit and a more collimated fashion due to high angle losses associated with waveguide light injection. The end of Waveguide 303 may have a texture for LED mixing and beam spreading, a lensed surface for beam shaping, or a holographic diffuser for structured beam outputs. The end of Waveguide 303 can be flush with the bottom of the opening in the housing (for maximum light extraction and efficiency) or recessed back from the opening in the housing to eliminate the potential for glare and provide mechanical shielding for the optical output.

While LED source 304 is shown to use Waveguide 303 as a means for projecting light down onto the work surface, one skilled in the art will recognize that a recessed strip of LEDs mounted along the bottom edge, with or without diffusers or optics, could accomplish the same effect with the added complication of powering LEDs at both edges of the lamp "head".

LED source 306 produces rear-facing light through a beam-shaping optic 307 (like a TIR) and potentially a holographic diffuser for creating specific patterns on a rear wall (like a rectangular distribution.)

The control of LED source 2 (lo/med/hi and CCT) are separate and independent from LED Source 1 and 3. Those could be used separately or in combinations, such as:

Mode 1: Direct Circadian support (LED source 1 low, LED source 3 off)

Mode 2: Direct/Indirect Circadian support (LED source 1 low, LED source 3 low).

Mode 3: Selfie-SAD Direct (LED source 1 high, LED source 3 off)

Mode 4: Selfie-SAD Direct/Indirect ((LED source 1 high, LED source 3 high)

The ability to adjust between various modes and on/off states can be triggered by an app, a sensor, a clock, a user-defined schedule or some combination of these inputs.

Further examples include a lamp 400 with only LED source 1 and 2 as show in FIG. 4, or lamp 500 with only source 1 and 2 with an integrated wireless charging facility 501 for smartphones as shown in FIG. 5.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A lamp comprising:

a work light source configured to emit work light downward to illuminate a work surface;

a circadian stimulation (CS) light source having a light emitting surface for emitting CS light in at least a first mode normal to said work light, CS light in said first mode having a first EML and a first brightness sufficient to cause circadian entrainment in a user.

2. The lamp of claim 1, wherein said first EML is at least 50, 100, 150, 200, 250, 300, or 350.

3. The lamp of claim 2, wherein said EML is at least 275.

4. The lamp of claim 1, wherein said first brightness is at least 10, 30, 50, 75, 100, 150, 200, 300, 400, 500, 600, 700, 800, 900, or 1000 nits, and is no greater than 10,000, 7000, 5000, 3000, 2000, 1000, 900, 800, or 700 nits.

5. The lamp of claim 4, wherein said first brightness is about 300 to 800 nits.

6. The lamp of claim 1, wherein said CS light source is configured to emit CS light and a second mode, said CS light in said second mode has a second EML and a second brightness, wherein at least one of said second EML or said second brightness is greater than said first EML or said first brightness, respectively.

7. The lamp of claim 6, wherein said second EML is at least 2× said first EML.

8. The lamp of claim 6, wherein said second brightness is at least 2× said first brightness.

9. The lamp of claim 6, wherein both said second EML and second brightness are greater than said first EML and said first brightness respectively.

10. The lamp of claim 1, wherein said CS light in said first mode has a first color rendering index (CRI), and wherein said CS light source is configured to emit high quality light and a second mode, said high quality light in said second mode having a second CRI and a second brightness, wherein said second CRI and said second brightness or greater than said first CRI and said first brightness respectively.

11. The lamp of claim 10, wherein said second CRI is greater than 90, 91, 92, 93, 94, or 95.

12. The lamp of claim 1, wherein said second brightness is at least 2× said first brightness.

13. The lamp of claim 1, wherein said work light source is configured with at least one of adjustable work-light brightness or adjustable correlated color temperature (CCT).

14. The lamp of claim 13, wherein said work light as a maximum work light brightness at least 2× said first brightness.

15. The lamp of claim 13, wherein said CCT is adjustable between 2500 and 6,000K.

16. The lamp of claim 1, wherein said work light is shielded from said user's eyes.

17. The lamp of claim 1, further comprising a projection light source for emitting projected light to illuminate a wall, said projected light having a third EML and a third brightness wherein said third brightness is greater than said first brightness.

18. The lamp of claim 17, wherein said third EML is at least 50, 100, 150, 200, 250, 300, or 350.

19. The lamp of claim 17, wherein said projected light is emitted in a direction opposite from light being emitted from said light emitting surface.

20. The lamp of claim 17, wherein said projected light has a CRI of greater than 90, 91, 92, 93, 94, or 95.

* * * * *